United States Patent
Chan et al.

(10) Patent No.: US 8,954,915 B2
(45) Date of Patent: Feb. 10, 2015

(54) STRUCTURED PLACEMENT OF HIERARCHICAL SOFT BLOCKS DURING PHYSICAL SYNTHESIS OF AN INTEGRATED CIRCUIT

(71) Applicant: International Business Machines Corporation, Armonk, NY (US)

(72) Inventors: Yiu-Hing Chan, Poughkeepsie, NY (US); Mark D. Mayo, Wappingers Falls, NY (US); Shyam Ramji, Lagrangeville, NY (US); Paul G. Villarrubia, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/903,334

(22) Filed: May 28, 2013

(65) Prior Publication Data

US 2014/0359546 A1 Dec. 4, 2014

(51) Int. Cl.
  *G06F 17/50* (2006.01)
(52) U.S. Cl.
  CPC .................................. *G06F 17/5072* (2013.01)
  USPC ............ 716/132; 716/119; 716/134; 716/135
(58) Field of Classification Search
  USPC .................................. 716/119, 132, 134–135
  See application file for complete search history.

(56) References Cited

U.S. PATENT DOCUMENTS

| | | | |
|---|---|---|---|
| 5,838,583 A | 11/1998 | Varadarajan et al. | |
| 6,223,329 B1 | 4/2001 | Ling et al. | |
| 6,282,693 B1 * | 8/2001 | Naylor et al. | 716/114 |
| 6,378,115 B1 | 4/2002 | Sakurai | |
| 6,792,585 B1 | 9/2004 | Ku et al. | |
| 6,801,884 B2 * | 10/2004 | Ferreri et al. | 703/13 |
| 6,883,156 B1 * | 4/2005 | Khainson et al. | 716/111 |
| 7,082,591 B2 * | 7/2006 | Carlson | 326/38 |
| 7,082,595 B1 * | 7/2006 | Chan et al. | 716/119 |
| 7,117,473 B1 * | 10/2006 | Knol et al. | 716/124 |
| 7,404,168 B2 * | 7/2008 | Miller et al. | 716/122 |
| 7,512,922 B1 | 3/2009 | Stenz | |
| 7,581,197 B2 * | 8/2009 | Arunachalam | 716/119 |
| 8,069,426 B2 * | 11/2011 | Nequist | 716/106 |

(Continued)

OTHER PUBLICATIONS

McKeever et al.; "Provably-correct hardware compilation tools based on pass separation techniques"; Formal Aspects of Computing (2006) 18; pp. 120-142.*

(Continued)

*Primary Examiner* — Naum B Levin
(74) *Attorney, Agent, or Firm* — Steven L. Bennett; Jack V. Musgrove (57) ABSTRACT

Integrated circuit design uses a library of structured soft blocks (SSBs) composed of pre-defined sets of cells with their logic implementation and placement templates with their relative placement information. A compiler receives a circuit description which includes an instance of an SSB and unfolds the instance according to the placement template to generate a modified circuit description which includes the relative placement information. The placement of circuit objects is optimized while maintaining relative locations for cells of the SSB instance according to the relative placement information. The SSB may be hierarchical. Gate resizing of cells in the SSB instance may result in a change in its bounds. A timing optimization procedure for the modified circuit description may be carried out while hiding internal details of the SSB instance. For example, buffers may be inserted in nets external to the SSB instance while preventing insertion of buffers in any internal nets.

12 Claims, 5 Drawing Sheets

(56) References Cited

U.S. PATENT DOCUMENTS

| | | | |
|---|---|---|---|
| 8,136,060 B1* | 3/2012 | Nequist | 716/100 |
| 8,239,792 B2 | 8/2012 | Arunachalam | |
| 8,356,267 B2 | 1/2013 | Agarwal et al. | |
| 8,375,345 B1 | 2/2013 | Barowski et al. | |
| 8,607,019 B2* | 12/2013 | Chung | 711/171 |
| 8,677,306 B1* | 3/2014 | Andreev et al. | 716/136 |
| 2002/0087939 A1 | 7/2002 | Greidinger et al. | |
| 2004/0021490 A1* | 2/2004 | Baxter et al. | 327/165 |
| 2006/0271894 A1* | 11/2006 | Arunachalam | 716/10 |
| 2009/0313594 A1* | 12/2009 | Arunachalam | 716/9 |
| 2012/0209888 A1* | 8/2012 | Chung | 707/802 |

OTHER PUBLICATIONS

Chen, Wei, et al., "Simultaneous Gate Sizing and Placement", IEEE Transactions on Computer-Aided Design of Integrated Circuits and Systems, v. 9, n. 2, pp. 206-214 (2006).

Chou, Sheng, et al., "Structure-aware placement for datapath-intensive circuit designs", Proc. 49th Design Automation Conf., pp. 762-767 (2012).

Nakatake, Shigetoshi, "Structured Placement with Topological Regularity Evaluation", Proc. Asia and South Pacific Design Automation Conf., pp. 215-220 (2007).

* cited by examiner

```
bit_group   mygroup1
  A    Bit=0  Level=0
  B    Bit=1  Level=0
  C    Bit=2  Level=0
  D    Bit=3  Level=0
  E    Bit=0  Level=1    SNAP_ROW=LOWER
  F    Bit=1  Level=1    SNAP_ROW=LOWER
  G    Bit=2  Level=1    SNAP_ROW=LOWER
  H    Bit=3  Level=1    SNAP_ROW=LOWER
  I    Bit=0  Level=2    SNAP_ROW=LOWER
  J    Bit=2  Level=2    SNAP_ROW=LOWER
  K    Bit=0  Level=3
  L    Bit=2  Level=3
```

```
bit_group ssb_C
  C0   Bit=0  LEVEL=0
  C1   Bit=1  LEVEL=0
  C2   Bit=2  LEVEL=0
  C3   Bit=3  LEVEL=0
  CB   Bit=0  LEVEL=1  BIT_GROUP=ssb_B
  CA   Bit=0  LEVEL=2  BIT_GROUP=ssb_A
```

STRUCTURED PLACEMENT OF HIERARCHICAL SOFT BLOCKS DURING PHYSICAL SYNTHESIS OF AN INTEGRATED CIRCUIT

BACKGROUND OF THE INVENTION

1. Field of the Invention

The present invention generally relates to the design of integrated circuits and semiconductor devices, and more particularly to a method of constraining placement and optimizations for a selected group of cells in an integrated circuit design.

2. Description of the Related Art

Integrated circuits are used for a wide variety of electronic applications, from simple devices such as wristwatches, to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells. Each of the cells of an IC may have one or more pins, each of which in turn may be connected to one or more other pins of the IC by wires. The wires connecting the pins of the IC are also formed on the surface of the chip. For more complex designs, there are typically at least four distinct layers of conducting media available for routing, such as a polysilicon layer and three metal layers (metal-1, metal-2, and metal-3). The polysilicon layer, metal-1, metal-2, and metal-3 are all used for vertical and/or horizontal routing.

An IC chip is fabricated by first conceiving the logical circuit description, and then converting that logical description into a physical description, or geometric layout. This process is usually carried out using a "netlist," which is a record of all of the nets, or interconnections, between the cell pins, including information about the various components such as transistors, resistors and capacitors. A layout typically consists of a set of planar geometric shapes in several layers. The layout is then checked to ensure that it meets all of the design requirements, particularly timing requirements. The result is a set of design files known as an intermediate form that describes the layout. The design files are then run through a dataprep process that is used to produce patterns called masks by an optical or electron beam pattern generator. During fabrication, these masks are used to etch or deposit features in a silicon wafer in a sequence of photolithographic steps using a complex lens system that shrinks the mask image. The process of converting the specifications of an electrical circuit into such a layout is called the physical design.

Cell placement in semiconductor fabrication involves a determination of where particular cells should optimally (or near-optimally) be located on the surface of a integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn around time and enhanced chip performance. Several different programming languages have been created for electronic design automation (EDA), including Verilog, VHDL and TDML. A typical EDA system receives one or more high level behavioral descriptions of an IC device, and translates this high level design language description into netlists of various levels of abstraction. Two traditional approaches to placement include standard cell designs wherein cells are generally of uniform height but varying width and are placed along rows defined in the circuit layout, and mixed designs where standard cells are interspersed with fixed circuit blocks referred to as macros. Macros are typically rectangular but may have other shapes, for example, rectilinear. An IC design, or portions thereof, can also be laid out in a customized fashion, i.e., manually.

Physical synthesis is prominent in the automated design of integrated circuits such as high performance processors and application specific integrated circuits (ASICs). Physical synthesis is the process of concurrently optimizing placement, timing, power consumption, crosstalk effects and the like in an integrated circuit design. This comprehensive approach helps to eliminate iterations between circuit analysis and place-and-route. Physical synthesis has the ability to repower gates (changing their sizes), insert repeaters (buffers or inverters), clone gates or other combinational logic, etc., so the area of logic in the design remains fluid. However, physical synthesis can take days to complete, and the computational requirements are increasing as designs are ever larger and more gates need to be placed. There are also more chances for bad placements due to limited area resources.

Current microprocessor trends are integrating traditionally custom designs with random logic macros (RLMs) into very large integrated circuit designs. In some cases, entire microprocessor units are designed using an automated synthesis flow that integrates these traditional custom designs and RLMs. This type of merged synthesis run is referred to as large block synthesis (LBS). The LBS blocks typically require different handling than traditional RLMs. In particular, as the size of the designs grow, it takes significant effort to make synthesis generate architecturally correct placement solutions due to placement instability as problems with timing and congestion are incrementally solved.

SUMMARY OF THE INVENTION

The present invention is generally directed to a method, system and program product for designing a layout of an integrated circuit by receiving a library file having at least one placement template for a structured soft block composed of a pre-defined set of cells with relative placement information for the pre-defined set of cells, receiving a circuit description for the integrated circuit which includes a plurality of cells and at least one instance of the structured soft block interconnected to form a plurality of nets, unfolding the structured soft block instance according to the placement template to generate a modified circuit description which includes the relative placement information for cells of the structured soft block instance, and optimizing a placement of the plurality of cells and the structured soft block instance while maintaining relative locations for cells of the structured soft block instance according to the relative placement information. The structured soft block may be a first (hierarchical) structured soft block, and the placement template may include a second structured soft block within the first structured soft block, the second structured soft block being composed of a subset of the pre-defined set of cells. One or more gates in at least one cell of the structured soft block instance may be resized such that bounds of the structured soft block instance change. In the illustrative implementation, the placement template includes a plurality of rows, the relative placement information for each cell in the pre-defined set of cells includes a first coordinate indicating a row assignment and a second coordinate indicating a location assignment with a row, cells in at least one row of the placement template have varying heights, and this row has a height corresponding to a height of a tallest cell in the row. The relative placement information may further include a parameter for at least one cell in this row indicating whether the cell is to be located along a top edge of the one row or is to be located along a bottom edge of the one row. A timing optimization procedure for the modified circuit description may be carried out while maintaining the relative locations for cells of the structured soft block instance and preventing any changes to internal details of the structured soft block instance. The timing optimization procedure may include insertion of one or more buffers in at least one net external to the structured soft block instance but prevents insertion of any buffers in any net internal to the hierarchical structured soft block instance.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Processor design teams continually focus on improving their productivity by attempting to leverage physical synthesis solutions. A major obstacle to this endeavor is that physical synthesis cannot duplicate some structures traditionally created using a custom design approach, particularly for integrated circuit microprocessors. So even though much of the processor logic remains amenable to synthesis, some small subset still requires a significant investment of skilled engineers. However, it is difficult to identify at the early design stage every structure that needs to be customized. As a result, the circuit generally starts out as a fully synthesized design, where over time bits and pieces become customized. The problem with this methodology is twofold. First, there is no incremental technique to customize parts of a larger synthesized design. Second, the effort level associated with performing the full custom design is quite large. It would, therefore, be desirable to devise an improved method of integrated circuit design which could allow some customization at earlier stages in the design while maintaining the benefits of automated placement routines. It would be further advantageous if the method could facilitate synthesis of a variety of designs while maintaining high-performance requirements.

The present invention achieves these objectives by creating a relative placement specification paradigm, and a repository concept that allows designers to create structured soft blocks (SSBs) composed of a pre-defined set of library cells to capture the most valuable aspects of a custom design, but allowing the designer to stop short of full customization. The resulting circuit design achieves the benefits of customization with much less resource investment. In addition to the repository concept, a logic entry and synthesis paradigm can be used to allow logic designers to instantiate SSBs in their high-level logic, and from there the rest of the synthesis flow will comply, while fully supporting the notion of reuse.

Figure 1:
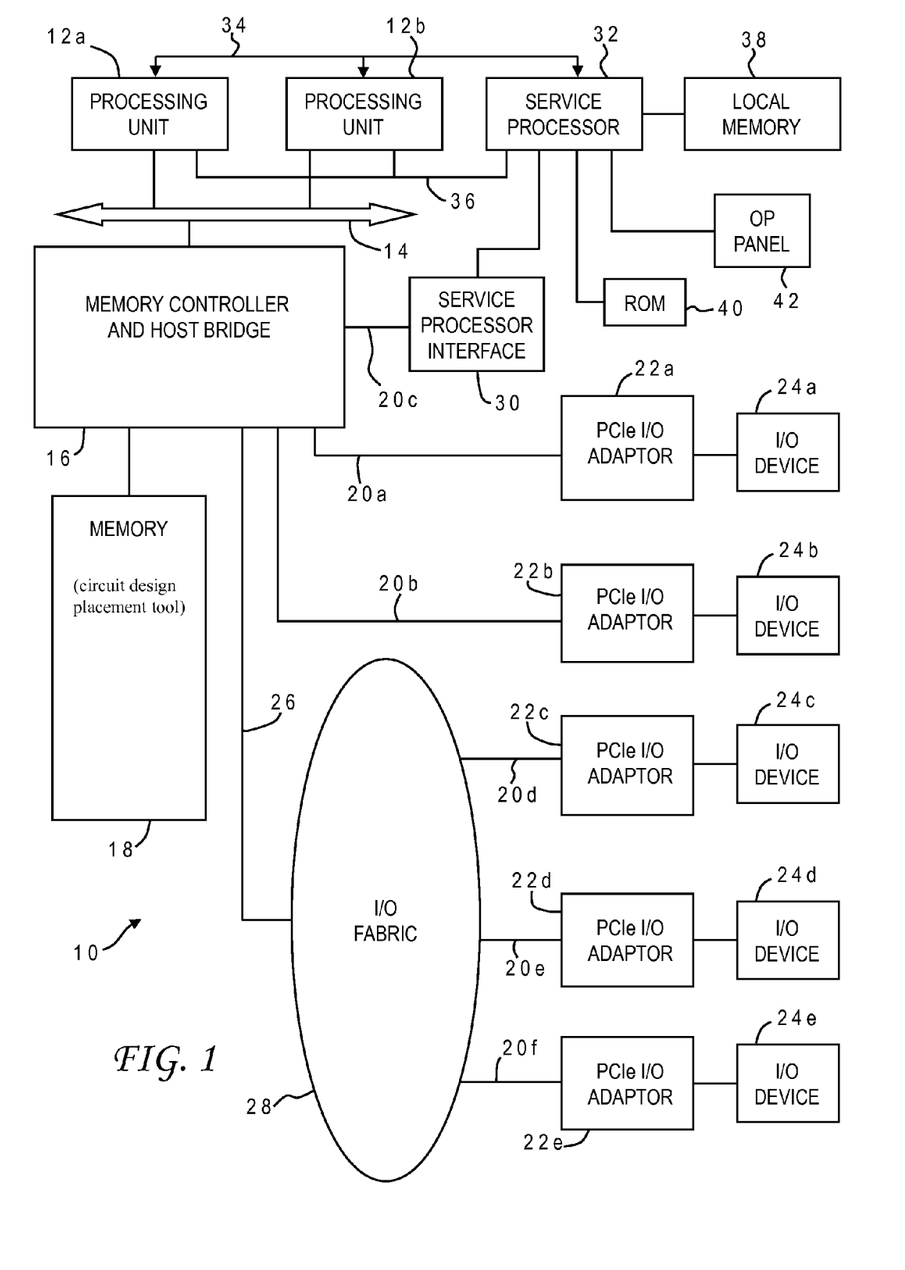
FIG. 1 is a block diagram of a computer system programmed to carry out integrated circuit design in accordance with one implementation of the present invention.

With reference now to the figures, and in particular with reference to FIG. 1, there is depicted one embodiment 10 of a computer system in which the present invention may be implemented to carry out the design of logic structures in an integrated circuit. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the circuit design application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such computer-readable storage media excludes transitory media such as propagating signals.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for a circuit design process that uses novel placement techniques as part of a physical synthesis process. Accordingly, a program embodying the invention may include conventional aspects of various placement and synthesis tools, and these details will become apparent to those skilled in the art upon reference to this disclosure.

Figure 2A:
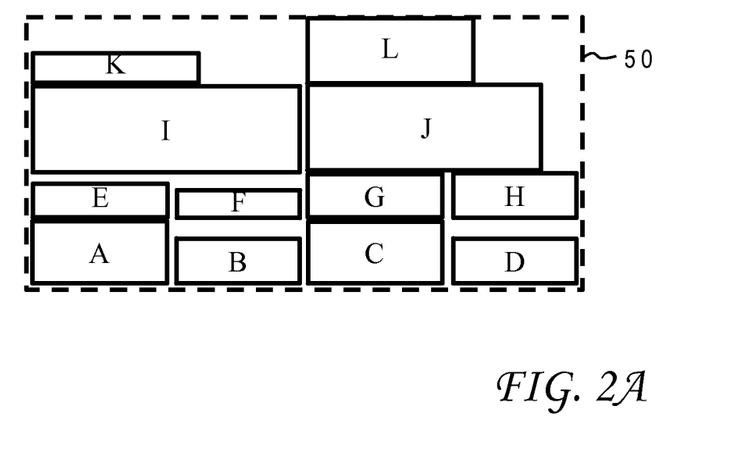
FIG. 2A is a plan view of one example of a structured soft block (SSB) constructed in accordance with the present invention by defining relative placement coordinates for a selected group of cells.
Figure 2B:
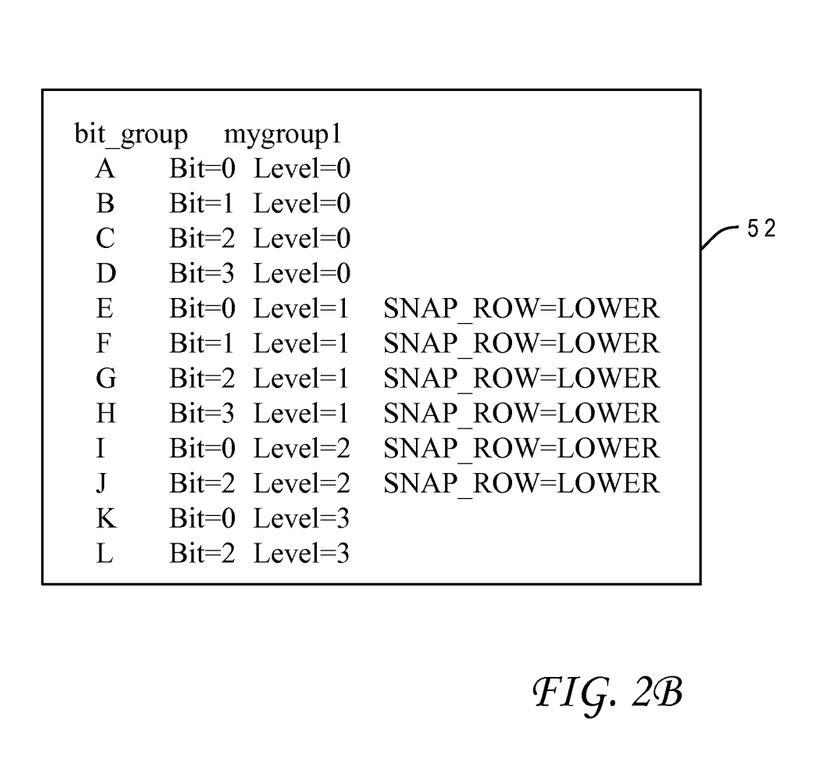
FIG. 2B is a coding example or placement template for the SSB of FIG. 2A in accordance with one implementation of the present invention.

Referring now to FIG. 2, there is depicted one example of a structured soft block (SSB) 50 constructed in accordance with the present invention which includes a plurality cells A through L. These cells may be part of an integrated circuit design, or a portion thereof. The integrated circuit may in particular be a large block synthesis (LBS) design having many instances of these cells. The cells may be part of a design library which contains associated information for each cell type (gate sizes, resistances, capacitances, etc.). The present invention allows the designer to modify the hardware description language (HDL) file for the circuit to inform the synthesis tool exactly how objects A through L are supposed to be placed relative to each other according to the designer's preferences. FIG. 2B shows specific SSB placement template coding 52 that may be used for the example of SSB 50. In SSB placement template coding 52, an SSB ("bit_group") has been defined and given the label "mygroup1". Each subsequent line of SSB placement template coding 52 includes a cell designator ("A", "B", etc.) and corresponding relative placement information for the designated cell. In the illustrative embodiment, the relative placement information takes the form of two values representing a row within an SSB template and a location along the row. For example, cells A through D have been assigned to the first row (in this implementation, the lowest row) by setting a "Level" parameter to zero. The locations of cells A through D within this lowest row are set using a "Bit" parameter. Cell A has a bit location of "0" indicating that it should be placed at the first available cell location within the row, i.e., at an anchor point (origin) for the SSB template. In this implementation, the anchor point is the lower left corner but the anchor point could default to a different location as desired. Accordingly, the "Bit" and "Level" parameters are similar to x and y coordinates in a Cartesian system, although they do not necessary represent exact positional values. In SSB placement template coding 52, cell B has a bit location of "1" indicating it should be at the second available cell location within the lowest row (next to cell A), while cell C has a bit location of "2" indicating it should be at the third available cell location (following cell B), and cell D has a bit location of "3" indicating it should be at the final cell location of the row. Cells are not necessarily placed immediately adjacent to one another; for example, in SSB 50 there are only two cells, K and L, in the topmost row, and cell K is given a bit location of "0" while cell L is given a bit location of "2" leaving a gap which in this case is actually big enough to accommodate another cell. SSB 50 has four rows, designated as levels "0" through "3".

The cells do not necessarily have the same dimensions, particularly height (the vertical direction in FIG. 2A), and in the preferred implementation the height of a given row is equal to the tallest cell assigned to that row. As a result, the row heights for a given SSB are not necessarily uniform. For SSB 50, the bottom and top rows ("0" and "3") have the same height, while the second row ("1") is shorter and the third row ("2") is taller. Furthermore, due to the varying cell heights a row could start at different vertical positions across bit locations of the SSB. Thus, to align cells in a row across the bit positions, another coding parameter can be used to indicate how the cell should be placed vertically within the row, i.e., against the bottom edge of the row versus the top edge of the row. For example, in SSB placement template coding 52 cells E through H in the second row have a parameter "SNAP_ROW" which has been set to "LOWER", forcing the cells in that row to be placed along the lower edge of the row (the cells could alternatively be forced along the upper edge of the row by setting the "SNAP_ROW" parameter to "UPPER"). Other parameters may also be used to determine cell location within the template; for example, a vertical gap can be created between rows. The placement template could be a shape other than rectangular, e.g., rectilinear.

Figure 3:
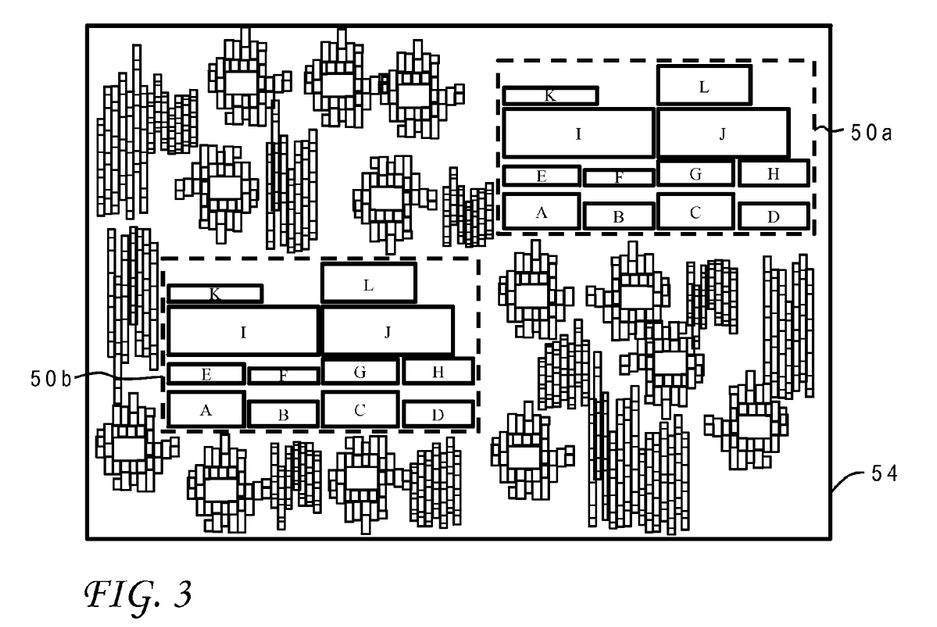
FIG. 3 is a plan view of a layout for an integrated circuit design illustrating the use of multiple instances of the SSB of FIG. 2A in accordance with one implementation of the present invention.

The bit compile file for a given SSB (i.e., the coding that represents the placement template) can be stored in the design library for the synthesis tool along with a gate-level (structural) netlist for the SSB, i.e., the logical relationships between the cells forming the SSB. Once the SSB is available in the library, it can be used and re-used for different circuit designs. FIG. 3 illustrates how multiple instances of an SSB may be used in an integrated circuit design. A layout 54 for the integrated circuit design includes a multitude of cells which have been individually placed, along with two instances 50a, 50b of the SSB from FIG. 2A. Any conventional placement algorithm can be used to place SSBs (as unitary structures) with the circuit layout along with the non-SSB cells, macros, etc. For example, the placement algorithm may be adapted to minimize total quadratic wirelength between cells/SSBs. While only two instances of SSB 50 are seen in FIG. 3, those skilled in the art will appreciate that the number of instances of an SSB in a particular design is essentially unlimited. The instances may retain the same SSB name ("mygroup1") as a suffix while using a different prefix to distinguish between the instances.

Figure 4A:
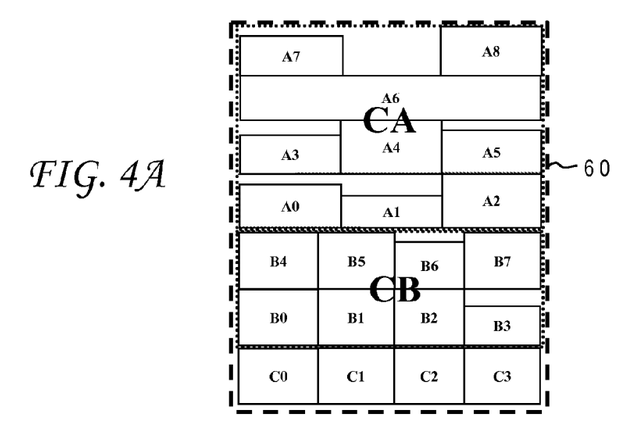
FIG. 4A is a plan view of one example of a hierarchical (higher-level) SSB constructed in accordance with the present invention which includes lower-level SSBs.
Figure 4B:
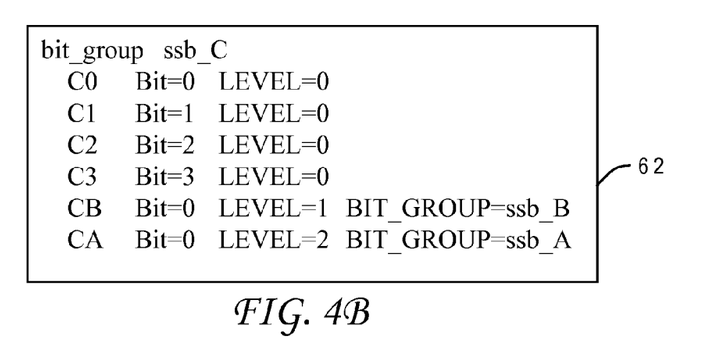
FIG. 4B is a coding example for the SSB of FIG. 4A in accordance with one implementation of the present invention.

SSBs constructed in accordance with the present invention may further be hierarchical in nature, i.e., one SSB at a higher logic level may be composed of one or more other SSBs at a lower logic level, along with other cells. FIG. 4A shows one example of a higher level SSB 60 which is composed of four cells C0 through C3 and two lower level SSBs CA and CB. SSB placement template coding 62 for SSB 60 is seen in FIG. 4B, and gives the SSB (bit_group) the label "ssb_C". The six subsequent lines give the row assignments for the four cells and two lower level SSBs, and the locations of these objects within each row. The last two lines designating the lower level SSBs CA and CB have an additional parameter "BIT_GROUP" which is used to indicate that these objects are themselves SSBs. The "BIT_GROUP" parameter for SSB CA has been set to "ssb_A", meaning that the bit compile coding will refer to another definition (not shown) for an SSB with the label "ssb_A" which includes the subset of cells A0 through A8. Similarly, the "BIT_GROUP" parameter for SSB CB has been set to "ssb_B", meaning that the bit compile coding will refer to another definition (also not shown) for an SSB with the label "ssb_B" which includes the subset of cells B0 through B7. While FIG. 4A illustrates only two hierarchical levels, those skilled in the art will appreciate that more levels of SSBs may be similarly nested. For example, SSB 60 could itself be used as a building block for an even larger SSB. Additionally, users may create custom SSB templates by inserting appropriate coding with the HDL file for a particular circuit.

Figure 5:
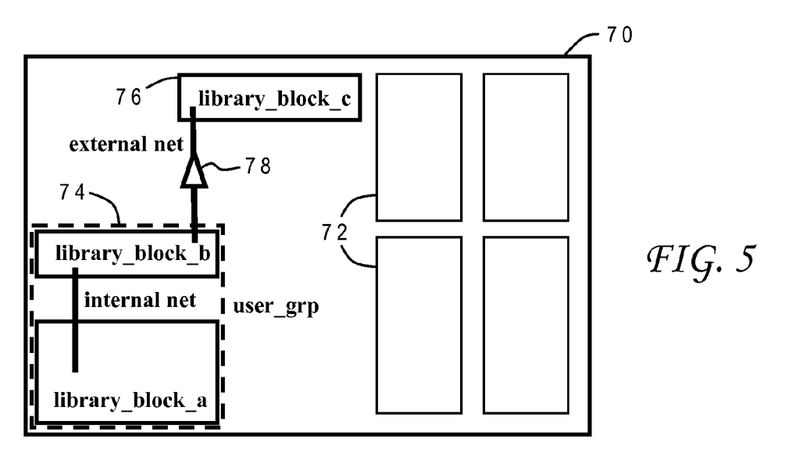
FIG. 5 is a plan view of a layout for an integrated circuit design illustrating how internal nets of an SSB are hidden from a buffering optimization procedure in accordance with one implementation of the present invention.

SSBs are not only useful in the placement optimization portion of physical synthesis, but may also be applied for other selected optimizations, such as timing optimizations. For example, physical synthesis can insert buffers (including other repeaters such as inverters) along selected wire paths (nets) to achieve timing closure. The present invention hides internals nets from this buffering stage, as illustrated in FIG. 5. FIG. 5 depicts a portion 70 of circuit design having several fixed blocks 72 (e.g., IP blocks or macros) and two SSBs 74, 76. SSB 74 is composed of two lower level library SSBs "library_block_a" and "library_block_b" with an internal net interconnecting them. SSB 76 is composed of a library SSB "library_block_c" and an external net interconnects SSB 76 with SSB 74. In accordance with the present invention, the buffering stage of the optimizations will allow a buffer 78 to be placed along the external net, but no buffering is applied to the internal net. There may be additional nets internal to each library block a, b, c (not shown) and those internal nets are likewise hidden.

Other internal details of an SSB may be hidden for various optimizations. Logic restructuring may be inhibited for cells within an SSB. Logic restructuring is one of the basic steps in optimizing the timing of a chip design. The purpose of logic restructuring is to find a circuit that has an identical logic function of an original circuit but has reduced propagation delays through the circuit. Internal pins of an SSB (i.e., pins of cells within an SSB which are not used for external nets) may be hidden to prevent pin-swapping. Cells of an SSB may be hidden during some gate resizing operations, although gate resizing of SSB cells may be allowed later in the process as described further below. Cells of an SSB may also be hidden to prevent cloning.

Figure 6:
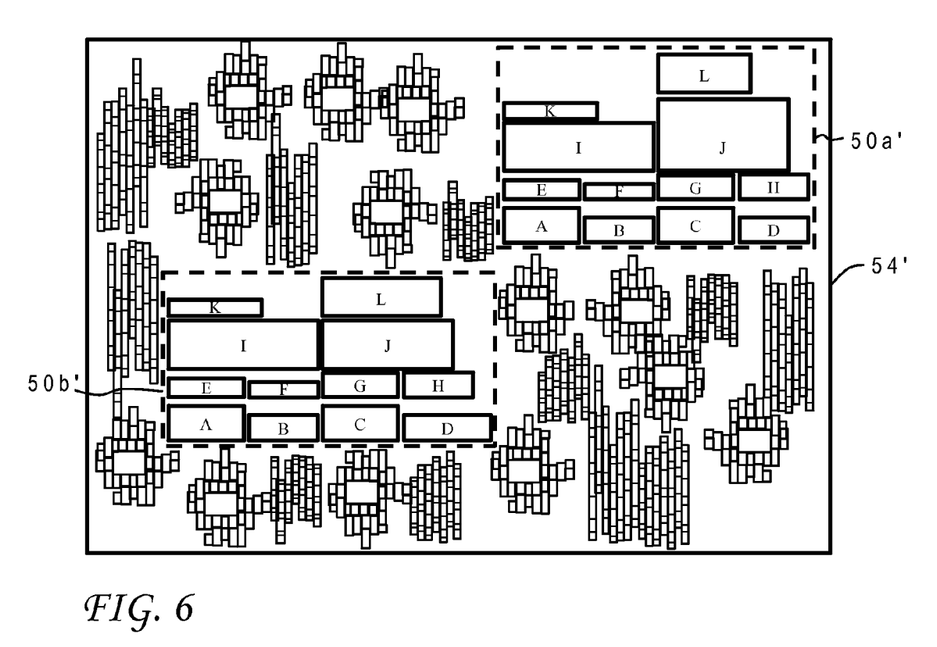
FIG. 6 is a plan view of a modified layout for the integrated circuit design of FIG. 3 depicting gate resizing of cells which changes the bounds of the SSB instances in accordance with one implementation of the present invention.

The contents of these hierarchical SSBs are visible down to the lowest hierarchical level (leaf level) elements, i.e., cells, when embedded within a design. Therefore, unlike pre-designed hard blocks (who contents would not be visible), the structured blocks of the present invention may be considered as "soft". SSBs may also be considered "soft" in the sense that the footprint of the SSB as it is implemented (instantiated) can vary. For example, a designer could change the size of one or more cells in an SSB as it is coded in the library, or the same SSB template could be applied to circuits having different fabrication technologies (e.g., submicron, deep submicron, ultra-deep submicron). Additionally, the bounds of an SSB instance can change as a result of gate resizing of cells within the SSB. FIG. 6 depicts a modified layout 54' for the same circuit of FIG. 3 having modified instances 50a', 50b' which are identical to the previous instances except for two cells which have been resized. In instance 50a', the height of cell J has been increased as a result of gate resizing, and in instance 50b', the width of cell D has been increased as a result of gate resizing. While such gate resizing may be accommodated by the present invention, the relative placement information is advantageously maintained, so cell J is still in the third row of instance 50a' (the topmost row having cell L has nudged upward) and cell D is still in the last cell location ("3") of the bottommost row of instance 50b'. FIG. 6 illustrates a more generalized example where the cells can be resized in any dimension, but the designer may prefer to constrain resizing to only one dimension, e.g., vertical.

Figure 7:
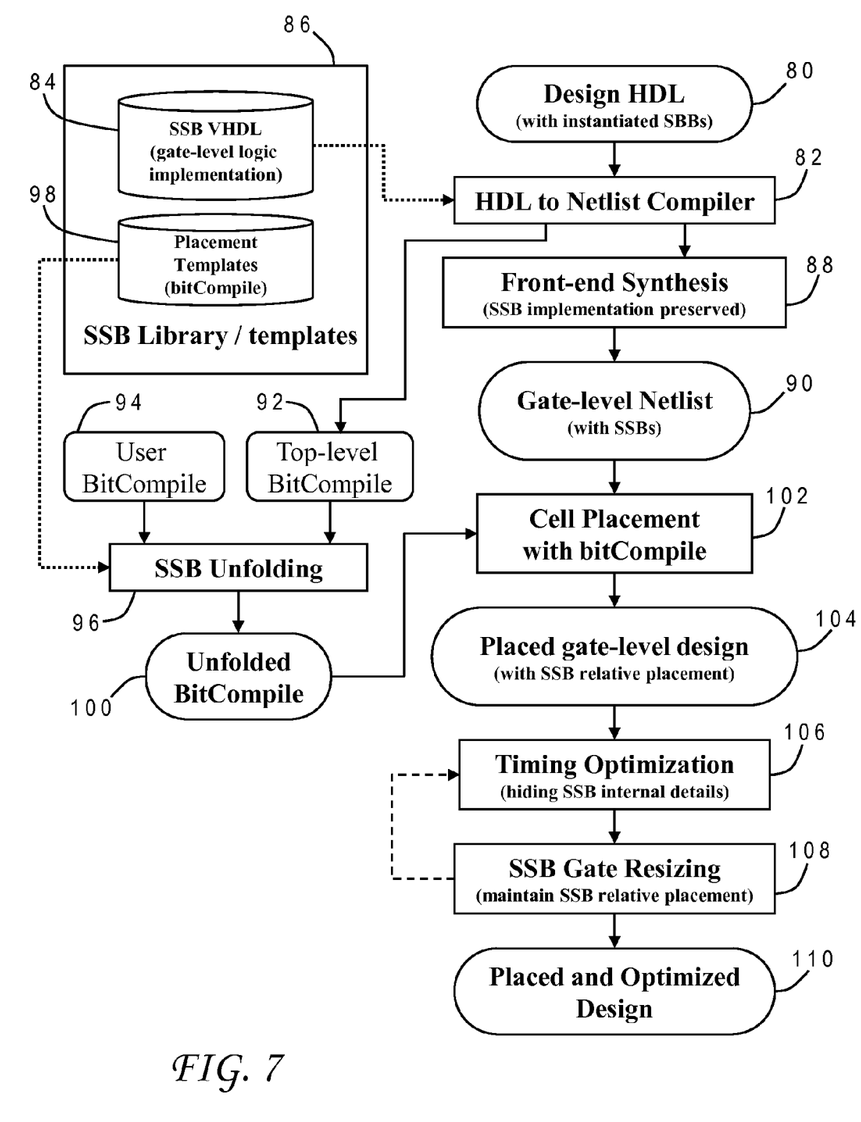
FIG. 7 is a chart illustrating the logical flow for a structured placement process in accordance with one implementation of the present invention.

The present invention may be further understood with reference to the chart of FIG. 7 which illustrates the logical flow for a structured placement process in accordance with one implementation. The process begins with a design HDL file (netlist) 80 having one or more instantiated SSBs. HDL file 80 is read by a netlist compiler 82 which also receives a gate-level logic description 84 for the referenced SSB from a pre-existing SSB library 86. The compiled netlist having the full logic information then undergoes a front-end synthesis procedure 88. In the preferred implementation, front-end synthesis procedure 88 generally involves logic synthesis and mapping of logic gates to library cells for a given technology. The result of front-end synthesis 88 is a gate-level netlist 90 which includes the SSBs. The netlist from compiler 82 is also used by a top-level bitCompile routine 92 to deconstruct the SSBs. A user bitCompile routine 94 may additionally be employed to allow the designer to customize additional SSBs. The outputs of the top-level and user bitCompile routines 92, 94 are analyzed in an SSB unfolding procedure 96 which obtains the relative placement information 98 for the SSB from the corresponding template stored in library 86. The result of SSB unfolding procedure 96 is the unfolded bitCompile file, specifying relative locations for cells of all SSBs. This information is combined with the logic from gate-level netlist 90 in a placement optimization 102 which preserves the relative locations of cells within any SSB, resulting in a placed gate-level design 104. Placed gate-level design 104 may then undergo one or more additional optimizations including a timing optimization 106 in which the internal details of the SSB are hidden from the optimizer tool. The design may then be subject to gate resizing, including gate resizing of SSB cells 108. The process can optionally return to the timing optimizations 106 until appropriate termination criteria are achieved. The final result of the process of FIG. 7 is a placed and optimized circuit design 110.

The present invention accordingly achieves a custom quality-of-result (QOR) with much less design effort that a full customization process, enabling a greater percentage of the designs to be synthesized while still meeting the high-performance requirements. This approach leads to a low latency design cycle, and hence increases the productivity of the IC design teams. The present invention is particularly useful in current trends in circuit design towards more synthesized macros and towards large block synthesis (LBS). The template/library concept naturally enables reuse and migration to any follow-on technologies.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described in the context of 2-dimensional relative placement information, the concepts herein could be extended to 3-dimensional relative placement information. It is therefore contemplated that such modifications can be made without departing from the spirit or scope of the present invention as defined in the appended claims.

What is claimed is:

1. A method for designing a layout of an integrated circuit comprising:
receiving a library file having at least one placement template for a structured soft block composed of a pre-defined set of cells with relative placement information for the pre-defined set of cells, by executing first instructions in a computer system;
receiving a circuit description for the integrated circuit which includes a plurality of cells and at least one instance of the structured soft block interconnected to form a plurality of nets, by executing second instructions in the computer system;
unfolding the structured soft block instance according to the placement template to generate a modified circuit description which includes the relative placement information for cells of the structured soft block instance, by executing third instructions in the computer system;
optimizing a placement of the plurality of cells and the structured soft block instance while maintaining relative locations for cells of the structured soft block instance according to the relative placement information, by executing fourth instructions in the computer system;
resizing one or more gates in at least one cell of the structured soft block instance such that physical bounds of the structured soft block instance change, by executing fifth instructions in the computer system; and
carrying out a timing optimization procedure for the modified circuit description while maintaining the relative locations for cells of the structured soft block instance and preventing any changes to internal details of the structured soft block instance, by executing sixth instructions in the computer system, wherein the timing optimization procedure includes insertion of one or more buffers in at least one net external to the structured soft block instance but prevents insertion of any buffers in any net internal to the structured soft block instance.

2. The method of claim 1 wherein the structured soft block is a first structured soft block, and the placement template includes a second structured soft block within the first structured soft block, the second structured soft block being composed of a subset of the pre-defined set of cells.

3. The method of claim 1 wherein:
the placement template includes a plurality of rows;
the relative placement information for each cell in the pre-defined set of cells includes a first coordinate indicating a row assignment and a second coordinate indicating a location assignment with a row;
cells in at least one row of the placement template have varying heights; and
the one row has a height corresponding to a height of a tallest cell in the one row.

4. The method of claim 3 wherein the relative placement information further includes a parameter for at least one cell in the one row indicating whether the one cell is to be located along a top edge of the one row or is to be located along a bottom edge of the one row.

5. A computer system comprising:
one or more processors which process program instructions;
a memory device connected to said one or more processors; and
program instructions residing in said memory device for designing a layout of an integrated circuit by receiving a library file having at least one placement template for a structured soft block composed of a pre-defined set of cells with relative placement information for the pre-defined set of cells, receiving a circuit description for the integrated circuit which includes a plurality of cells and at least one instance of the structured soft block interconnected to form a plurality of nets, unfolding the structured soft block instance according to the placement template to generate a modified circuit description which includes the relative placement information for cells of the structured soft block instance, optimizing a placement of the plurality of cells and the structured soft block instance while maintaining relative locations for cells of the structured soft block instance according to the relative placement information, resizing one or more gates in at least one cell of the structured soft block instance such that physical bounds of the structured soft block instance change, and carry out a timing optimization procedure for the modified circuit description while maintaining the relative locations for cells of the structured soft block instance and preventing any changes to internal details of the structured soft block instance wherein the timing optimization procedure includes insertion of one or more buffers in at least one net external to the structured soft block instance but prevents insertion of any buffers in any net internal to the structured soft block instance.

6. The computer system of claim 5 wherein the structured soft block is a first structured soft block, and the placement template includes a second structured soft block within the first structured soft block, the second structured soft block being composed of a subset of the pre-defined set of cells.

7. The computer system of claim 5 wherein:
the placement template includes a plurality of rows;
the relative placement information for each cell in the pre-defined set of cells includes a first coordinate indicating a row assignment and a second coordinate indicating a location assignment with a row;
cells in at least one row of the placement template have varying heights; and
the one row has a height corresponding to a height of a tallest cell in the one row.

8. The computer system of claim 5 wherein the relative placement information further includes a parameter for at least one cell in the one row indicating whether the one cell is to be located along a top edge of the one row or is to be located along a bottom edge of the one row.

9. A computer program product comprising:
a computer-readable storage medium; and
program instructions residing in said storage medium for designing a layout of an integrated circuit by receiving a library file having at least one placement template for a structured soft block composed of a pre-defined set of cells with relative placement information for the pre-defined set of cells, receiving a circuit description for the integrated circuit which includes a plurality of cells and at least one instance of the structured soft block interconnected to form a plurality of nets, unfolding the structured soft block instance according to the placement template to generate a modified circuit description which includes the relative placement information for cells of the structured soft block instance, optimizing a placement of the plurality of cells and the structured soft block instance while maintaining relative locations for cells of the structured soft block instance according to the relative placement information, resizing one or more gates in at least one cell of the structured soft block instance such that physical bounds of the structured soft block instance change, and carry out a timing optimization procedure for the modified circuit description while maintaining the relative locations for cells of the structured soft block instance and preventing any changes to internal details of the structured soft block instance wherein the timing optimization procedure includes insertion of one or more buffers in at least one net external to the structured soft block instance but prevents insertion of any buffers in any net internal to the structured soft block instance.

10. The computer program product of claim 9 wherein the structured soft block is a first structured soft block, and the placement template includes a second structured soft block within the first structured soft block, the second structured soft block being composed of a subset of the pre-defined set of cells.

11. The computer program product of claim 9 wherein:

the placement template includes a plurality of rows;

the relative placement information for each cell in the pre-defined set of cells includes a first coordinate indicating a row assignment and a second coordinate indicating a location assignment with a row;

cells in at least one row of the placement template have varying heights; and the one row has a height corresponding to a height of a tallest cell in the one row.

12. The computer program product of claim 9 wherein the relative placement information further includes a parameter for at least one cell in the one row indicating whether the one cell is to be located along a top edge of the one row or is to be located along a bottom edge of the one row.

* * * * *